3,652,508
VISCOSITY STABLE ALIPHATIC POLYURETHANE COMPOSITIONS AND METHOD OF PREPARATION THEREOF
Donald L. Segur, Andover, and Harold E. Garey, Jr., Ipswich, Mass., assignors to General Latex and Chemical Corporation, Cambridge, Mass.
No Drawing. Filed Apr. 7, 1969, Ser. No. 814,159
Int. Cl. C08g 22/04, 22/08
U.S. Cl. 260—77.5 AA        24 Claims

ABSTRACT OF THE DISCLOSURE

Viscosity-stable aliphatic polyurethane resin compositions are prepared by reacting an alkylene oxide with moisture present in the organic polyfunctional compound prior to the reaction of the compound, such as a polyol, with the aliphatic polyisocyanate compounds to prepare the aliphatic polyurethane resin.

BACKGROUND OF THE INVENTION

This invention relates to urethane compositions and more particularly to urethane compositions prepared from aliphatic isocyanates which contain a stabilizing agent.

Urethane compositions are widely known in the art for use in coatings, specifically solvent coatings, in foams, in non-cellular castings and extrusions, such as threads. Such urethanes possess properties which are highly desirable. However, urethanes prepared from aliphatic isocyanates, which possess an improved light stability property not found in the aromatic isocyanates, are subject to viscosity instability which can advance to the gel stage thus rendering the urethanes substantially useless and substantially shortening the shelf life of the composition.

It is believed that the stability problem results from the presence of water in varying amounts from trace amounts up to several percent in the solvents and other reactants used with the isocyanates to prepare the urethanes. Where the normal preparation of the urethane involves the formation of the urethane by reacting, e.g., a hydroxyl containing material such as a polyol, and an isocyanate, water reacts with the isocyanate to form an amine and the free amine reacts with other isocyanate groups to form an urea group, which is a cross-linked structure and leads to gelation. Thus, the presence of moisture in the initial compositions reduces the availability of isocyanate group for subsequent reaction. In the case of aliphatic diisocyanates, a continuous and progressive viscosity increase occurs which eventually reaches the gel stage. Depending upon the methods of preparation and catalysts and other reactants present, and the amount of moisture in the system, the viscosity change may proceed slowly over a relatively long period of time or result in a relatively rapid gelation of the composition. Thus, the presence of water in the system results in a non-uniform series of changes in the properties of the compositions which cannot be compensated for or predicted, with respect to degree, in advance.

In the past various methods have been employed in order to eliminate or minimize the problems encountered by the presence of moisture in the system. For example, U.S. Pat. No. 3,376,252, discloses the incorporation of a 2,2-dimethoxypropane as an anti-gelling agent. However, the reactants were subjected to azeotropic distillation to remove the water. U.S. Pat. No. 3,369,000 discloses hydrolyzable esters, such as alkyl esters, of orthoformic acid as one of the water-binding agents in polyurethane preparations. Such hydrolyzable esters apparently are deficient in some manner since the industry recommends the use of water-free solvents, polyols and other reactants, which are rendered water-free by azeotropic distillation of the reactants immediately prior to the addition of the isocyanate in the manner indicated in U.S. Pat. No. 3,376,252.

Azeotropic distillation is rather a tedious and expensive operation which involves charging the various reactants to a vessel, adding, for example, 1 to 5 percent of the total weight of benzene, toluene or the like and then refluxing the entire batch to remove the added solvent together with all the moisture. This step is uneconomical, time consuming, expensive, and involves the distillation of a solvent which is undesirable in many plant applications and which, of course, requires special apparatus and safety precautions.

It has now been found that the deleterious effect of water in urethane compositions can be substantially eliminated.

SUMMARY OF THE INVENTION

Stable moisture-curable urethane compositions are prepared by adding to an organic polyvalent compound containing at least two reactive hydrogen-containing groups as determined by the Zerewitinoff method, prior to the reaction with aliphatic isocyanates, a hydrocarbon oxide capable of reacting with water. The preferred oxides include aliphatic oxide and aromatic oxides. Particularly preferred are the $C_2$ to $C_{10}$ alkylene oxides; more preferably $C_2$ to $C_5$ alkylene oxides. It should be understood that the term alkylene oxides refers to both the straight and branched chain compounds, as well as substituted and unsubstituted compounds. As examples of suitable alkylene oxides, mention may be made of ethylene oxide, propylene oxide, 2,2-dimethyl ethylene oxide, tetramethylene oxide, and epichlorohydrin.

The preferred aromatic oxide is styrene oxide. It should be understood that aromatic oxides may include nuclear substituents provided such substituents do not interfere with the water-scavenging properties of the oxides or with the formation of the urethane.

The stabilizing compounds of the present invention are preferably added in a slight excess over the stoichiometric ratio to the amount of water present. However, while the ratio of the stabilizing agent to the water is preferably slightly in excess of stoichiometric or greater, the amount employed is not critical and amounts less than stoichiometric may be employed. Less than stoichiometric amounts will not totally obviate the instability of the composition due to the presence of water but it will decrease to a proportionate degree the effect of the moisture present. Thus, less than stoichiometric amounts of the oxide can be used if, for example, a relatively short storage period is anticipated for the composition.

Preferably, the reactants, such as the solvents, reactive hydrogen compounds, catalysts and the like are analyzed to determine the amount of water present to select the proper amount of the oxide for employment in the process.

All the reactants, except for the catalyst and the diisocyanate are added to the reaction vessel with the oxide.

The reaction is then carried out in the conventional manner.

The following non-limiting comparative examples illustrate the novel composition and process of the present invention.

|  | Control (0.27% water), parts by weight | Invention (0.27% water), parts by weight |
| --- | --- | --- |
| TP740 (a 700 M.W. Triol of Wyandotte Chemical Co.) | 19.58 | 19.58 |
| Antioxidant (di-t-butyl p-cresol) | 0.40 | 0.40 |
| Xylol | 49.97 | 49.97 |
| Cellosolve acetate (urethane grade) | 10.01 | 10.01 |
| Catalyst (di-butyl tin dilaurate) | 0.03 | 0.03 |
| 4,4'-methylene-bis-(cyclohexyl isocyanate) | 20.01 | 20.01 |
| Propylene oxide | | 0.32 |

All reactants except catalyst and isocyanate are added to the reaction kettle. The kettle is sealed and heated to 50–60° C. The catalyst and isocyanate are added and the mixture is heated for one hour at 90–100° C. The thus-formed resin was cooled and removed. Additional catalysts, ultraviolet absorbers and other conventional additives may be added before packaging. The products showed the following characteristics:

|  | Control | Invention |
| --- | --- | --- |
| Percent NCO | 2.4 | 2.6 |
| Percent non-volatile | 40.5 | 40.3 |
| Typical viscosity, cps. (Brookfield #2 spindle, 60 r.p.m. at 25° C.): | | |
| Initial | 265 | 123 |
| 24 hours | 280 | 123 |
| 1 week | 395 | 125 |
| 1 month | 525 | 130 |

Thus, it can be readily seen that when the water is not removed, viscosity increases approaching gelation of the resin. In the composition of the present invention, however, the coating composition shows a stable viscosity and with a higher available NCO value.

That the present invention would be useful in urethane compositions is unexpected since the use of hydrocarbon oxides in the more widely used aromatic isocyanates such as toluene diisocyanate will not perform the same function. In fact, the effect of the hydrocarbon oxide on aromatic isocyanates is contrary to that found with the aliphatic isocyanates in that the compositions prepared from aromatic isocyanates employing such hydrocarbon oxides are less stable and subject to more rapid gelling than similar compositions which do not contain the oxide.

The urethane compositions of the present invention are moisture curable reaction products of a polyisocyanate with an organic polyvalent compound containing at least two reactive hydrogen-containing groups as determined by the Zerewitinoff method.

The term "isocyanate" as used herein is intended to refer to aliphatic polyvalent isocyanates, particularly diisocyanates. The isocyanates employed in the present invention are preferably liquid at reaction temperatures although solid isocyanates liquifiable in solvents are also suitable. As examples of suitable isocyanates, mention may be made of polymethylene diisocyanates and aliphatic diisocyanates having incorporated therein a ring system. Suitable isocyanates include hexamethylene diisocyanate; 4,4'-methylene-bis-(cyclohexylisocyanate); ω,ω'-diisocyanate-1,3-dimethyl benzene; 3-isocyanate methyl-3,5,5-trimethyl cyclohexyl isocyanate; 2,2,4-trimethyl hexamethylene diisocyanate; 2,4,4-trimethyl hexamethylene diisocyanate; 2,6-diisocyanate methyl caproate lysine diisocyanate, and the like. The term "isocyanate" as used herein is also intended to include polyurethane adducts or addition compounds which contain terminal isocyanato groups. Such compositions are conventionally prepared from diisocyanate treated under anhydrous conditions with compounds containing reactive hydrogen atoms such as polyhydric alcohols and the like.

Any suitable organic compounds containing at least two active hydrogen-containing groups as determined by the Zerewitinoff method, said groups being reactive with an organic polyisocyanate may be used to prepare urethanes in accordance with the present invention. The active hydrogen atoms are usually attached to oxygen, nitrogen, or sulfur atoms. Thus, suitable active hydrogen-containing groups include

—OH, —NH$_2$, —NH—, —OOOH, —SH and the like. Examples of suitable organic compounds include hydroxyl polyesters, polyhydric polyalkylene ethers, polyhydric polythioethers, polyacetates, aliphatic polyols, polyamines including aromatic, aliphatic and heterocyclic diamines, triamines, tetramines and the like; as well as mixtures thereof.

Although molecular weight of the organic compounds containing the active hydrogen-containing groups is not critical, it is preferred that the molecular weight range between 50 and 5000, more preferably 700 to 1000.

Particularly preferred compounds are the aliphatic polyols such as the alkane diols; for example, polyethylene glycol, 1,3-propylene glycol, 1,2-propylene glycol, 1,4-butylene glycol, polypropylene glycol, and the like.

Suitable organic solvents for use in the present invention are conventional and well known to the art and include benzene, toluene, xylene, hydroxyethyl acetate, hydroxypropyl acetate and the like.

The compositions of the present invention may also include additives conventionally employed with urethane compositions such as fillers, pigments, dyes, antioxidants, and the like.

The novel compositions of the present invention are particularly suitable for use as coating compositions dissolved in a volatile organic solvent. Such solvent compositions are particularly susceptible to viscosity instability and gelling unless a stabilizing agent is used because the solvent is one of the prime sources by which moisture is introduced into the system. Such solvent compositions, in addition to viscosity instability often exhibit a bubble or froth effect which is also attributed to the presence of moisture. Solvent urethane coating compositions are useful in forming tough, rubbery castings on various substrates, such as vinyl, wood and nylon and as paints and similar compositions.

The present invention is also suitable for use in urethane compositions which are to be used in the production of chemically or mechanically formed flexible foams. Such foams are widely used in the art for drapery materials, rug backings, clothing linings, furniture and the like.

The present invention is also useful in compositions employed in the formation of rigid and semi-rigid structures such as molded or cut-foam items.

A particular advantage of the present invention, particularly in the case of coating compositions, is that the effect of moisture present can be quickly and easily nullified by the addition of a very small amount of material which will not effect the clarity, reactivity, or other properties of the composition and which is compatible with conventional additives. The additives of the present invention are liquids or gases which also permit their ready introduction into the system without the necessity of initially dissolving, melting, or dispersing the additive.

What is claimed:

1. In a method of preparing a liquid-curable urethane resin composition, which method comprises reacting a first component containing an organic polyfunctional compound having at least two reactive hydrogen-containing groups as determined by the Zerewitinoff method and moisture with a second component containing an aliphatic polyisocyanate compound to provide a liquid-curable urethane resin which, in the presence of the moisture in the first component, increases in viscosity with time to an undesirable level, the improvement which comprises:
   (a) incorporating an alkylene oxide into the first component; and
   (b) reacting the moisture in the first component with the alkylene oxide prior to reacting the first component with the second component, the alkylene oxide being employed in an amount sufficient to stabilize the viscosity of the reactive urethane resin composition.

2. The method of claim 1 which includes: determining the amount of moisture present in the first component prior to reacting the components; and selecting the amount of alkylene oxide to be added to the first component based on such determination.

3. The method of claim 1 wherein the organic compound of the first component comprises an aliphatic polyol.

4. The method of claim 1 wherein alkylene oxide is selected from the group consisting of ethylene oxide, propylene oxide, 2,2-dimethylethylene oxide, tetramethylene oxide, epichlorohydrin and styrene oxide.

5. The method of claim 1 which includes: employing an amount of alkylene oxide of at least the stoichiometric amount in relation to the moisture present.

6. In a method of preparing a liquid-curable urethane resin composition, which method comprises reacting a polyol with an aliphatic polyisocyanate, the polyol composition containing moisture in an amount sufficient to effect an undesired increase in viscosity with time of the resulting urethane resin, the improvement which comprises: incorporating into the polyol prior to the reaction a sufficient amount of an alkylene oxide to react with the moisture present in the polyol composition, thereby providing a viscosity-stabilized urethane resin.

7. The method of claim 6 wherein the polyol is dissolved in an organic solvent.

8. The method of claim 6 wherein the alkylene oxide is employed in an amount in excess of the amount required to react with the moisture.

9. The method of claim 6 which includes determining the amount of moisture present in the polyol and incorporating therein at least a sufficient amount of alkylene oxide to react with the moisture determined to be present.

10. The method of claim 6 wherein the polyol is an aliphatic polyol and the polyisocyanate is a polymethylene disocyanate.

11. The method of claim 6 wherein the alkylene oxide is propylene oxide.

12. The method of claim 1 wherein the alphatic polyisocyanate compound is an aliphatic diisocyanate having incorporated therein a cyclohexyl ring system.

13. The method of claim 6 wherein the aliphatic polyisocyanate is 4,4' methylene-bis (cyclohexyl isocyanate).

14. A method of preparing a viscosity-stable aliphatic polyurethane resin composition, which method comprises:
   (a) providing a first component mixture containing an aliphatic polyol, and a volatile organic solvent, the mixture containing moisture in an amount which in a resulting aliphatic polyurethane resin composition would provide for an undesirable increase in viscosity with time;
   (b) adding to the first component propylene oxide in excess of the stoichiometric amount to react with the moisture present in the first component;
   (c) reacting the propylene oxide with the moisture in the first component mixture; and thereafter
   (d) reacting the polyol of the first component in the presence of a catalyst with an aliphatic diisocyanate to provide a viscosity-stable aliphatic polyurethane resin composition.

15. The method of claim 14 wherein the aliphatic polyol is polyethylene glycol, propylene glycol, butylene glycol or polypropylene glycol.

16. The method of claim 14 wherein the alipatic diisocyanate is a polymethylene diisocyanate or an aliphatic diisocyanate having incorporated therein a cyclohexyl ring system.

17. The method of claim 14 wherein the catalyst is a tin compound.

18. The method of claim 14 wherein the aliphatic polyol is polypropylene glycol, the diisocynate is a methylene bis(cyclohexyl isocyanate) and the catalyst is a tin compound.

19. The method of claim 1 wherein the aliphatic polyisocyanate comprises a polymethylene diisocyanate.

20. The method of claim 1 wherein the first component comprises as the polyfunctional compound a polyol in an organic solvent, and the second component comprises a diisocyanate and a catalyst for the reaction.

21. The viscosity-stable urethane resin composition produced by the method of claim 1.

22. The viscosity-stable urethane resin composition produced by the method of claim 6.

23. The viscosity-stable urethane resin composition produced by the method of claim 14.

24. The method of claim 14 which includes:
   (a) heating the first component containing the propylene oxide and moisture to a temperature of 50° to 60° C. to react the propylene oxide and moisture; and thereafter
   (b) heating the first component in the presence of a catalyst with an aliphatic diisocyanate at a temperature of 90° to 100° C. to react the polyol and diisocyanate.

References Cited
UNITED STATES PATENTS

| | | | |
|---|---|---|---|
| 3,268,482 | 8/1966 | Piirma et al. | 260—75 |
| 3,281,379 | 10/1966 | Fontaine et al. | 260—2.5 |
| 3,376,252 | 4/1968 | Peiser et al. | 260—45.7 |
| 3,406,140 | 10/1968 | Polestak et al. | 260—33.4 |
| 3,463,748 | 8/1969 | Scheibelhoffer | 260—18 |
| 3,479,325 | 11/1969 | Blomeyer et al. | 260—77.5 |
| 3,498,953 | 3/1970 | Elfers | 260—77.5 |
| 3,378,497 | 4/1968 | Lanham | 252—182 |
| 3,380,950 | 4/1968 | Blomeyer | 260—31.2 |
| 3,448,046 | 6/1969 | Schalin | 252—8.1 |

DONALD E. CZAJA, Primary Examiner

R. A. WHITE, Assistant Examiner

U.S. Cl. X.R.

260—75 NA